(12) United States Patent
Hickman et al.

(10) Patent No.: US 8,271,505 B2
(45) Date of Patent: *Sep. 18, 2012

(54) SYSTEM AND METHOD FOR ELECTRONIC MESSAGE NOTIFICATION

(75) Inventors: Paul L. Hickman, Los Altos Hills, CA (US); James J. Gough, Ben Lomond, CA (US)

(73) Assignee: G&H Nevada-Tek, Los Altos, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 11/440,702

(22) Filed: May 24, 2006

(65) Prior Publication Data

US 2007/0011202 A1    Jan. 11, 2007

Related U.S. Application Data

(63) Continuation of application No. 09/648,715, filed on Aug. 25, 2000, now Pat. No. 7,082,439.

(60) Provisional application No. 60/150,921, filed on Aug. 26, 1999.

(51) Int. Cl.
    *G06F 17/00* (2006.01)
    *G06F 7/00* (2006.01)
(52) U.S. Cl. ........................................... 707/754
(58) Field of Classification Search .................. None
    See application file for complete search history.

(56) References Cited

U.S. PATENT DOCUMENTS

| | | | |
|---|---|---|---|
| 5,276,869 A | 1/1994 | Forrest et al. | |
| 5,608,874 A | 3/1997 | Ogawa et al. | |
| 5,694,616 A * | 12/1997 | Johnson et al. | 709/207 |
| 5,724,574 A | 3/1998 | Stratigos et al. | |
| 5,732,219 A | 3/1998 | Blumer et al. | |
| 5,748,738 A | 5/1998 | Bisbee et al. | |
| 5,754,840 A | 5/1998 | Rivette et al. | |
| 5,778,352 A | 7/1998 | Inoue et al. | |
| 5,790,790 A | 8/1998 | Smith et al. | |
| 5,850,442 A | 12/1998 | Muftic | |
| 5,875,432 A | 2/1999 | Sehr | |

(Continued)

FOREIGN PATENT DOCUMENTS

JP    411143936 A  *  5/1999

OTHER PUBLICATIONS

Muramtsu et al., The Construction of the Paperless System in Japan Patent Office, 1992, NTT Data Communication System Corporation, IEEE/Systems Integration, 1992 ICSI 1992, Proceedings of the International Conference, 278-287.

(Continued)

*Primary Examiner* — Sathyanarayan Pannala
(74) *Attorney, Agent, or Firm* — TIPS Group

(57) ABSTRACT

A method, article of manufacture and system for electronic mail notification including determining that it is a time for at least one of a reminder notification action and a report notification action. For a reminder notification action, all action items within a given range are obtained and the action items are processed into at least one action item report which is e-mailed to at least one designated recipient. For a report notification action, the a list of completed action items in a given range are obtained and the list of completed action items is processed into at least one completed action report that is e-mailed to at least one designated recipient.

11 Claims, 14 Drawing Sheets

U.S. PATENT DOCUMENTS

| | | | |
|---|---|---|---|
| 5,895,468 | A * | 4/1999 | Whitmyer, Jr. ............... 707/10 |
| 5,930,471 | A * | 7/1999 | Milewski et al. ............ 709/204 |
| 5,956,489 | A | 9/1999 | San Andres et al. |
| 5,982,898 | A | 11/1999 | Hsu et al. |
| 5,987,429 | A | 11/1999 | Maritzen et al. |
| 6,014,663 | A | 1/2000 | Rivette et al. |
| 6,016,479 | A | 1/2000 | Taricani, Jr. |
| 6,073,105 | A | 6/2000 | Sutcliffe et al. |
| 6,092,102 | A * | 7/2000 | Wagner ...................... 340/7.29 |
| 6,105,056 | A * | 8/2000 | Gilchrist et al. ............ 709/206 |
| 6,138,162 | A | 10/2000 | Pistriotto et al. |
| 6,154,840 | A | 11/2000 | Pebley et al. |
| 6,161,146 | A | 12/2000 | Kley et al. |
| 6,182,124 | B1 | 1/2001 | Lau et al. |
| 6,185,683 | B1 | 2/2001 | Ginter et al. |
| 6,192,165 | B1 | 2/2001 | Irons |
| 6,192,407 | B1 | 2/2001 | Smith et al. |
| 6,195,686 | B1 * | 2/2001 | Moon et al. ................. 709/206 |
| 6,212,553 | B1 * | 4/2001 | Lee et al. .................... 709/206 |
| 6,230,156 | B1 * | 5/2001 | Hussey ......................... 707/10 |
| 6,237,096 | B1 | 5/2001 | Bisbee et al. |
| 6,289,460 | B1 | 9/2001 | Hajmiragha |
| 6,297,891 | B1 | 10/2001 | Kara |
| 6,298,327 | B1 | 10/2001 | Hunter et al. |
| 6,314,425 | B1 | 11/2001 | Serbinis et al. |
| 6,314,454 | B1 * | 11/2001 | Wang et al. .................. 709/206 |
| 6,324,648 | B1 | 11/2001 | Grantges, Jr. |
| 6,345,278 | B1 | 2/2002 | Hitchcock et al. |
| 6,363,361 | B1 | 3/2002 | Lundberg |
| 6,424,995 | B1 * | 7/2002 | Shuman ...................... 709/206 |
| 6,477,578 | B1 | 11/2002 | Mhoon |

OTHER PUBLICATIONS

John R.S. Orange, Filing Patent Applications Electronically: Practical Aspects and Legal Aspects of "EASY", 1994, Sim & McBurney, Toronto, Canada.

L. Masinter, "Returning Values From Forms: Mulitpart/Form-Data", Network Working Group, Xerox Corporation, Aug. 1998, http://www.ietf.org/rfc/rfc2388.txt.

* cited by examiner

SYSTEM AND METHOD FOR ELECTRONIC MESSAGE NOTIFICATION

CROSS REFERENCE TO RELATED APPLICATIONS

This application is a continuation of U.S. patent application Ser. No. 09/648,715, filed Aug. 25, 2000, now U.S. Pat. No. 7,082,439 which claims the benefit of U.S. Provisional Patent Application No. 60/150,921, filed Aug. 26, 1999, both of which are incorporated herein by reference.

TECHNICAL FIELD

The present invention relates generally electronic communication and, more particularly, to systems and methods for automatically delivering electronic messages to designated recipients.

BACKGROUND OF THE INVENTION

The proliferation of electronic office systems has created a need for exchanging and storing information. Electronic mail (e-mail) and other types of electronic messages are becoming extremely popular. E-mail networks permit networks of communicating users to transmit information from one user to another. This has led to the widespread use of electronic messages to share ideas, transmit documents, schedule meetings, and perform a multitude of other everyday tasks.

These tasks may be accomplished by a variety of software programs. For example, e-mail programs facilitate the transmission of messages between users. Messaging-enabled scheduling programs allow users to request and schedule meetings and appointments via electronic messages. In addition, computer programs such as desktop information managers coordinate the growing stream of electronic communications by incorporating e-mail, calendaring, task management, contact management, notes, and journal features into a single application program.

However, as data management systems grow more complex, more users interact with them, and issues such as performance, data integrity, workload management, batch processing, efficiency and continuous availability arise. Many systems on the market today can only handle small numbers of users simultaneously, offer little or no expansion capabilities, and frequently require manual intervention to process data through the system.

Users of data management systems often need to be reminded and apprised of approaching deadlines and other events. To keep these users informed, data management personnel typically check the data management system everyday and build lists of data items needed by the system users. Then, the data management personnel compile the data items into reports and send the reports to designated recipients, such as employees, or clients.

In view of the foregoing, what is needed are improved systems for getting the proper information (such as deadline information, competed action information, etc.) to the proper recipients. The system should be highly automated to decrease human error. Furthermore, the system should intelligently evaluate the data in a database and only forward desired data to authorized recipients. Moreover, the system preferably utilizes a fast delivery system, such as email.

SUMMARY OF THE INVENTION

The present invention addresses the above issues by providing an e-mail notification system for automatically delivering electronic messages. The e-mail notification system, in a preferred embodiment of the present invention, comprises a docketing program and a data manager system (database). The docketing program checks action items in the database, and then creates notifications, in the form of messages, according the action items. The messages are then automatically sent to authorized, designated recipients. The designated recipients are preferably searched from the action items by the docketing program.

It will therefore be appreciated that a method for electronic mail notification in accordance with the present invention includes determining that it is a time for at least one of a reminder notification action and a report notification action. For a reminder notification action, the method further includes obtaining all action items within a given range and processing the action items into at least one action item report and e-mailing the at least one action item report to at least one designated recipient. For a report notification action, the method further includes obtaining a list of completed action items in a given range and processing the list of completed action items into at least one completed action report and e-mailing the at least one completed action report to at least one designated recipient.

The method for obtaining of all action items and the obtaining a list preferably includes opening a docketing program, running a report, and saving the report for further processing. The docketing program may be a commercially available docketing program with built-in reporting capabilities. Preferably, processing the action items includes reading the saved report into memory, parsing the report into items, and filtering out unwanted items. Preferably, obtaining a list of completed action items includes reading the report into memory, parsing the report into items, and creating a list from the items.

Advantageously, the present invention provides the ability to generate and distribute several types of the messages including reports and reminders. Completed action items are processed to create reports and sent to clients as the designated recipients. All action items within a given region are processed by filters to create reminders, and are sent to authorized, designated recipients. Each of the reports comprises information about what has been done, while each reminder comprises information about what still needs to be done.

These and other advantages of the present invention will become apparent upon a reading of the following descriptions and a study of the various figures of the drawing.

BRIEF DESCRIPTION OF THE DRAWINGS

The subject matter which is regarded as the invention's particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF A PREFERRED EMBODIMENT

A preferred embodiment of the present invention will now be described with reference to the various figures of the drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
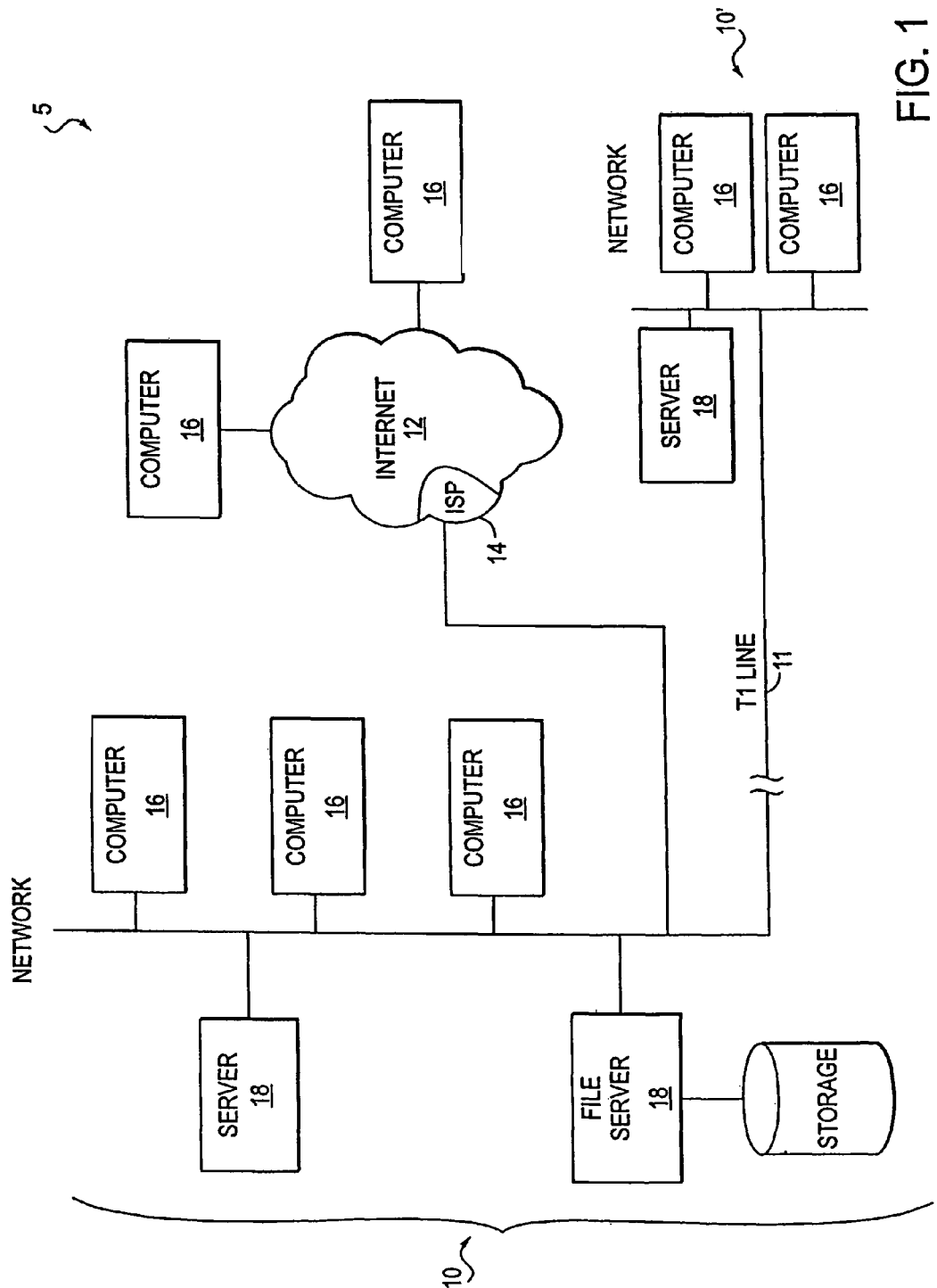
FIG. 1 is a schematic diagram of a network system in which the present invention may find application, in accordance with one embodiment of the present invention.

FIG. 1 is a schematic diagram of a network system 5 which may be utilized to implement an e-mail notification system, in accordance with one embodiment of the present invention. The network system 5 may connect to an internal Local Area Network (LAN) 10, or include two networks 10 and 10' that are connected together, such as with a T1 line 11. The network system 5 may also include a wide area network (WAN) 12, such as the Internet, typically through the services of an Internet Service Provider (ISP) 14. The LAN 10 preferably includes a plurality of individual computers or computer stations 16 and 18 respectively, as discussed in detail subsequently.

Figure 2:
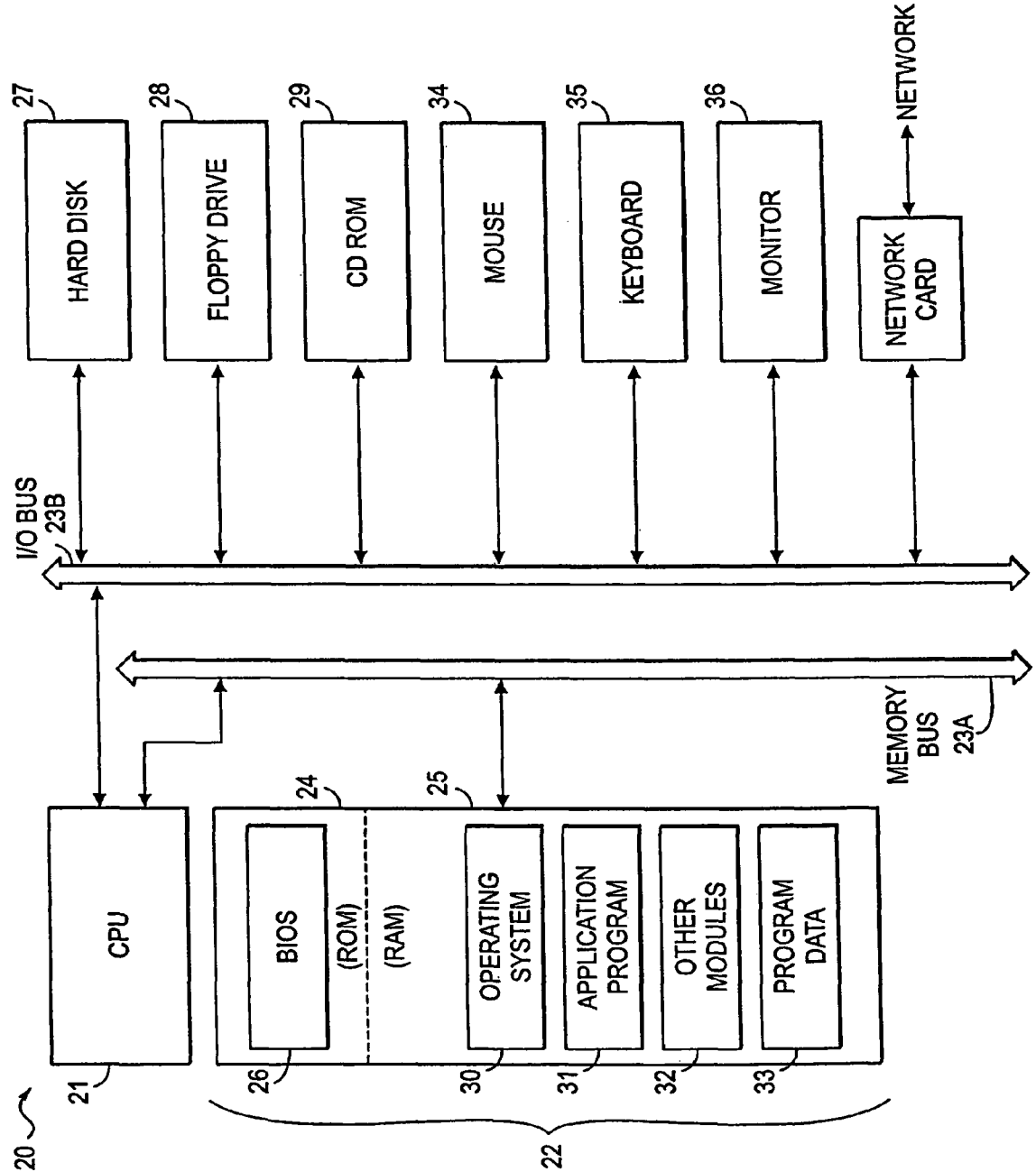
FIG. 2 is a pictorial view showing the elements of an exemplary computer system of the network system of FIG. 1.

FIG. 2 is an illustration showing an exemplary computer system 20 for use with the e-mail notification system, in accordance with another aspect of the present invention. These computer systems can be used for the computer stations 16 and 18, as will be appreciated by those skilled in the art. The computer system 20 comprises a central processing unit (CPU) 21, a system memory 22, and a system memory bus 23A which couples the system memory 22 to the processing unit 21. The system memory 22 typically includes read only memory (ROM) 24 and random access memory (RAM) 25. Typically included in the ROM 24 is a basic input/output system (BIOS) 26, which contains basic routines that help transfer information between elements within the personal computer 20, such as during start-up. The computer system 20 typically further includes peripherals, such as mass storage devices including a hard disk drive 27, a floppy drive 28, and a CD-ROM drive 29, as well as a pointing device such as a mouse 34, keyboard 35, monitor 36, and network card 37. These peripheral devices are typically coupled to an I/O bus 23B which is, in turn, coupled to the CPU 21.

A number of program modules may be stored in the drives and, temporarily, RAM 25 of the computer system 20, including at least portions of an operating system 30, one or more application programs 31, other program modules 32, and program data 33. Users typically enter commands and information into the computer system 20 utilizing the keyboard 35 and/or a pointing device, such as the mouse 34. These input devices are often connected to the processing unit 21 through the I/O bus 23B. Additionally, a monitor 36 is typically connected to the processing unit 21 through the I/O bus 23B. Finally, the computer system 20 may operate in a networked environment using logical connections to one or more remote computers, such as through a network card 37.

The e-mail notification system of the present invention comprises two parts—a reminder system, and a report system. However, it should be noted that the reminder system and report system can also be used independently of each other, and that each individually forms an embodiment of the present invention. The reminder system is used to send reminders to system users. These reminders typically comprise information such as due dates of action items, and are typically restricted to a given range of time. The report system is used to send reports to specified recipients, such as clients. Each report comprises information such as action type, due dates of the action items, and what has been done, or will be done, within a given range of time. The data used to generate the reminders and reports is preferably located in a docket database, containing various records of data.

Figure 3:
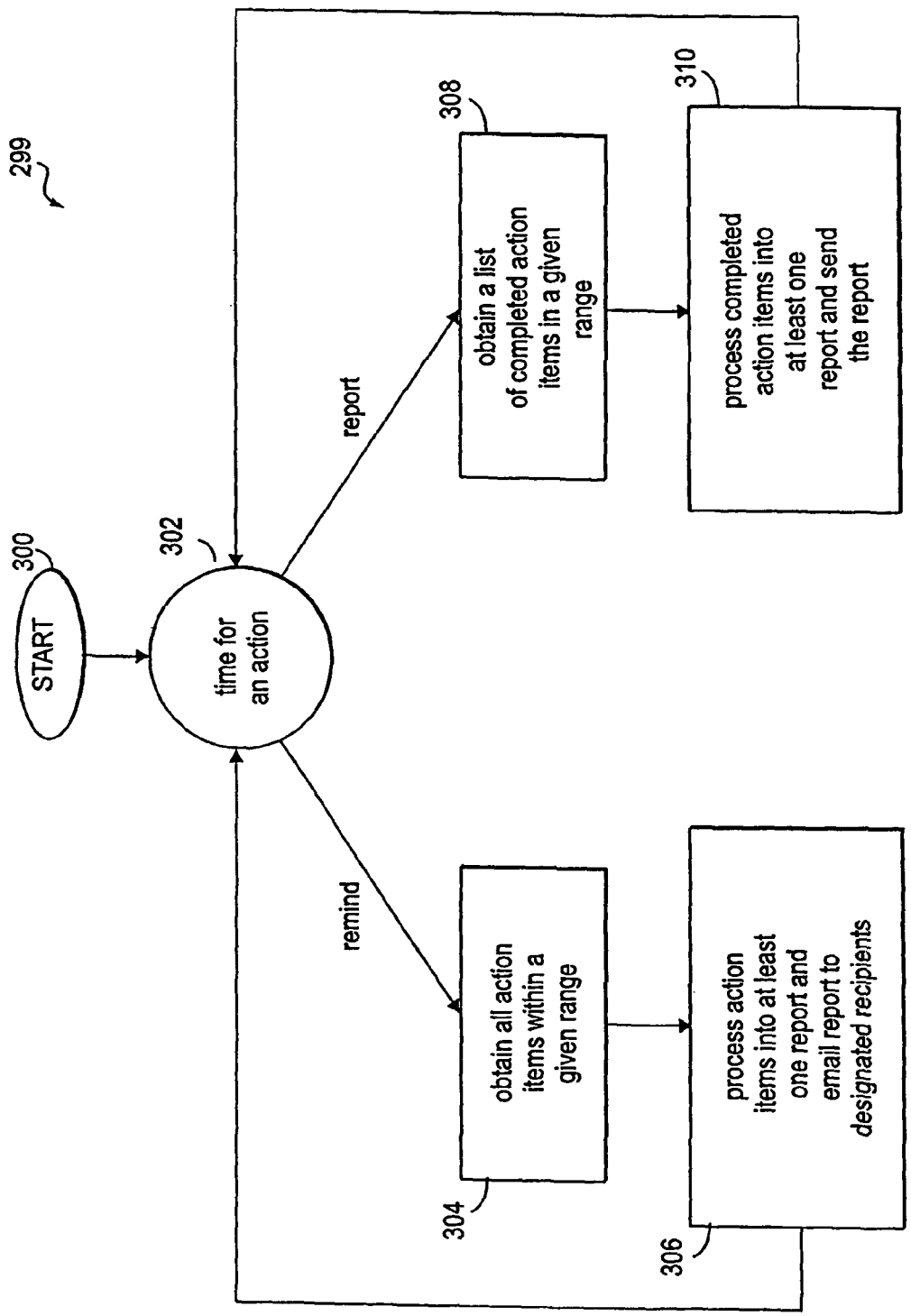
FIG. 3 is a flow diagram illustrating a method of automatically generating messages in accordance with the present invention.

FIG. 3 is a flowchart 299 illustrating a method of automatically generating messages, in accordance with an embodiment of the present invention. In an initial operation 300, pre-process operations occur, such as initializing the docket database and other initial operations that will be apparent to those skilled in the art.

In a timing operation 302, the present invention determines when a report or reminder is to be generated. This determination is preferably based on a system clock of computer 20. However, other methods may be utilized for timing, such as counters, and other techniques that will be apparent to those skilled in the art. Also included in operation 302, is a determination of what type of item to generate. For example, a decision can be made as to whether a reminder is to be generated or a report is to be generated. When generating a reminder, the method continues with operation 304. When generating a report, the method continues with operation 308. If both a reminder and a report need to be generated, one can be generated after the other, or both can be generated concurrently, as will be appreciated by those skilled in the art.

In an item gathering operation 304, all non-completed action items within a given range are obtained. In a preferred embodiment, this range is a range of time, preferably 2-4 weeks, but the range can be extended to include all the action items (i.e., the range equals infinity, or a period of time representing the same).

Next, in a reminder generating operation 306, the obtained actions items are processed into at least one reminder, which is then sent to designated recipients. By "designated" it is meant that an authorized recipient who has a pertinent message is added to a list of designated recipients. Typically, the processing of the action items includes filtering out unwanted action items, and determining to which recipients generated reminders should be sent. Generally, the recipients of reminders are employees (one example of an authorized recipient) who utilize the system, however reminders can be sent to recipients, such as vendors, clients, or customers, outside an organization (another example of an authorized recipient). Moreover, the present invention preferably creates an individual reminder for each designated recipient, thus allowing the reminders to be highly customizable for the individual needs of a particular recipient.

In an item gathering operation 308, if the system determines a report is to be generated, all completed action items within a given range are obtained. In a preferred embodiment, this range is a range of time, preferably 2-4 weeks, but the range can be extended to include all the action items (i.e., the range equals infinity, or a period of time representing the same).

Next, in a report generating operation 310, the obtained actions items are processed into at least one report, which is then sent to designated recipients. Typically, the processing of the action items includes filtering out unwanted action items, and determining to which recipients generated reports should be sent. Typically, the recipients of reports are, for example, clients, however, reports may be generated for internal personnel as well. Generally, the present invention creates an individual report for each designated recipient, thus allowing the reports to be highly customizable for the individual needs of a particular recipient.

Figure 4:
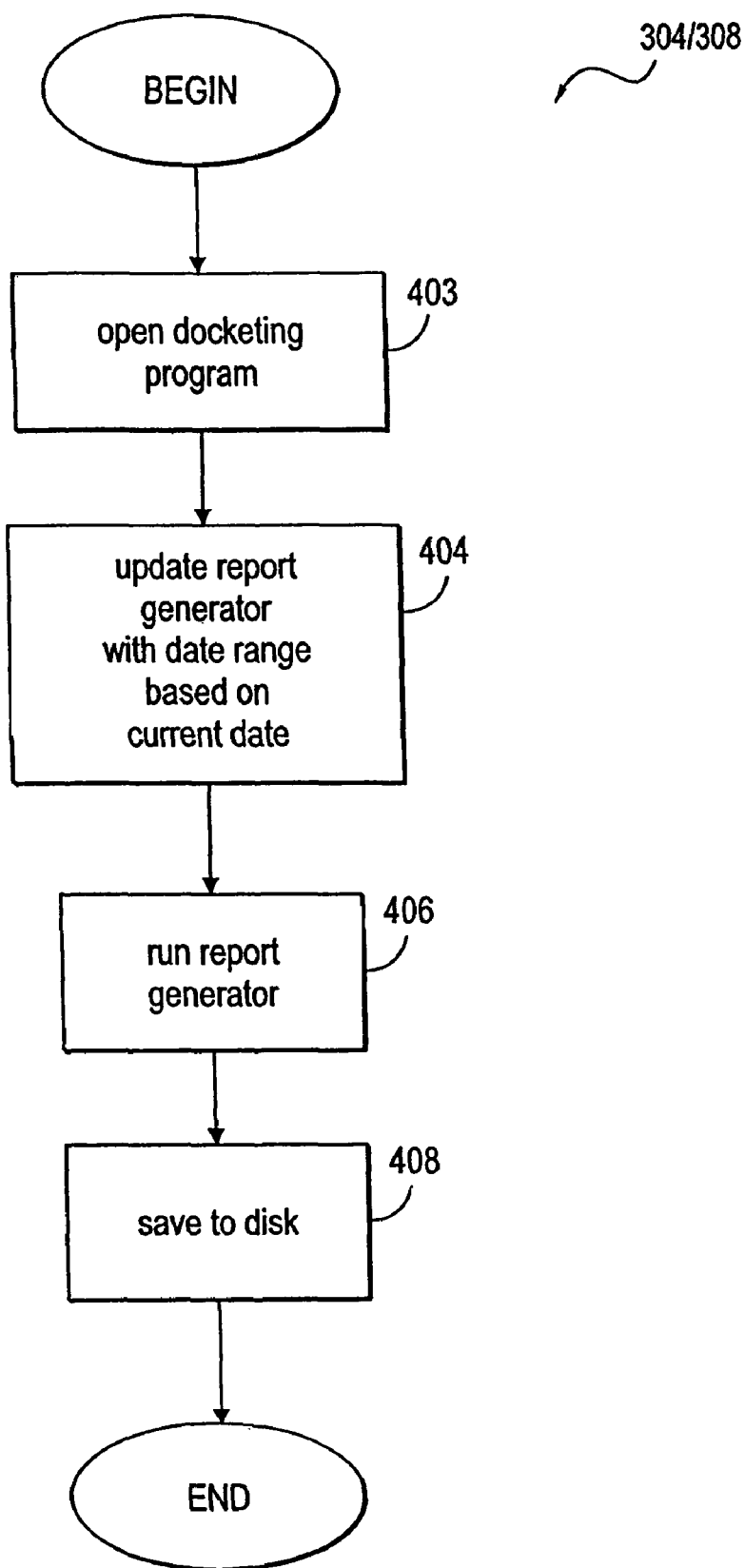
FIG. 4 is a flow diagram illustrating operation 304 and 308 of FIG. 3, in accordance with yet another embodiment of the present invention.

Referring next to FIG. 4, a method 304/308 illustrates operations 304 and 308 of FIG. 3 in greater detail. In this example, operations 304 and 308 utilize equivalent or analogous methods for obtaining action items within a given range. As used herein, an "action item" is a docket item having associated with it an action to be performed and a date for such performance. Such dates may be "hard" such as a "drop dead" or "bar" date, or "soft" such as a reminder, target, or tickler date.

As noted above, the action items obtained in operation 304 will generally be non-completed action items, while the action items obtained in operation 308 will generally be completed action items. The method 304/308 begins after the timing operation 302, where the systems determines when to send the reminders and reports.

In an open docketing program operation 402, a docketing program is opened. The docketing program can be any docketing program capable of generating reports within a given range. One suitable docketing program is PCMASTER by MASTER DATA CENTER located in Southfield, Mich. Typically, opening a docketing program includes inputting a user name and password, and navigating to an area within the docketing program containing a report generator. Alternatively, the docketing program can be integrated with the process 299 of the present invention, i.e., the e-mail notification feature is integrated with a docketing system and its database.

Next, in a range setting operation 404, the report generator is updated with a new date range based on the current date. Preferably, the report generator is capable of generating reports including action items falling within a range of time defined by a start date and an end date. During the range setting operation 404, the range is determined by calculating a start date and an end-date based on the current date.

In a report generating operation 406, the report generator is executed using the start and end dates determined in operation 404. The report generator creates a report using action items which fall within the date range determined in operation 404. Thus, the result is a report including action items to be completed within a given range of time.

In a saving operation 408, the generated report is preferably saved to a mass storage device, such as a hard disk. The method then continues to operation 306 of FIG. 3 if a reminder is being generated, or to operation 310 of FIG. 3 if a report is being generated.

Figure 5:
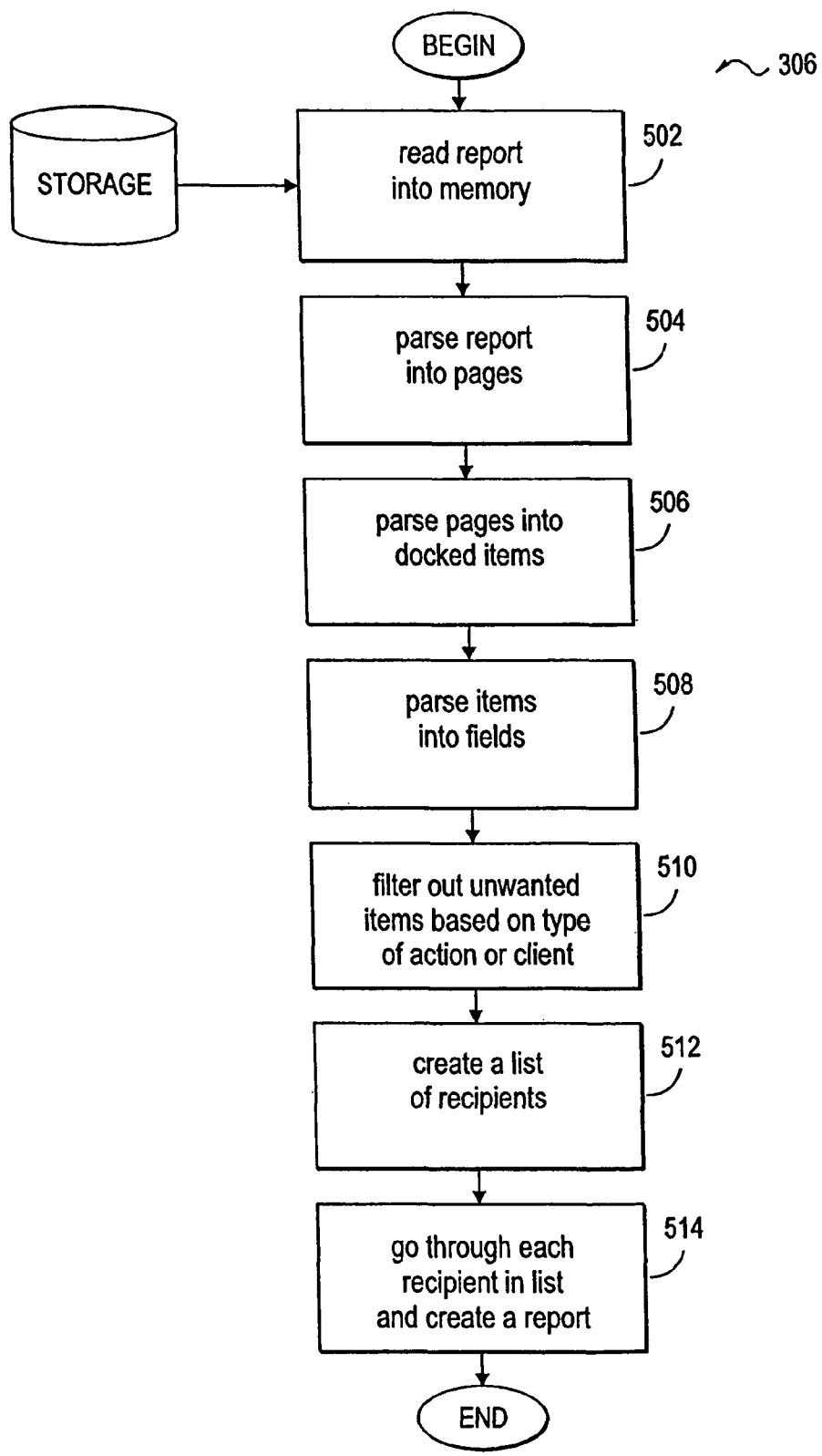
FIG. 5 is a flow diagram illustrating operation 306 of FIG. 3, in accordance with an embodiment of the present invention.

FIG. 5 is a flowchart illustrating operation 306 of FIG. 3, according to one embodiment of the present invention. In an initial operation 502, a report, generated in operation 304 is read from a mass storage device, such as a hard disk, into memory. Preferably, the report includes action items falling within a given range of time based on the current date, such as within two weeks of the current date.

In a page parsing operation 504, the report is parsed into pages of data. Typically, a report generated by a commercial report generator contains header and footer data. This data is generally not needed in the final reminder which is generated and sent out to a recipient. By parsing the generated report into pages, the header and footer data can be eliminated or saved for other uses. Moreover, other page formatting information, such as page breaks, may be eliminated by this technique.

In an item parsing operation 506, the parsed pages of data are further parsed into docket items. Each docket item typically includes a record of data related to that particular docket item, including action item type, and often includes personnel assigned to that action item.

Next, in a field parsing operation 508, the parsed docket items are parsed into fields. In this operation, individual fields of the docket item records are parsed out. These fields typically include the type of action item, the personnel assigned to the action item, and the related clients.

The method continues with a filtering operation 510. In operation 510, unwanted docket items are filtered out based on the field types included within the docket item. Typically, docket items having a specific type of field information are eliminated from further processing, as described in more detail below. Generally, filters are selected from the field types and set in the docketing program.

In a recipient list operation 512, a list of recipients is created. Using the fields of the filtered docket items, a list of recipients to which to send the final generated reminders is created. The list may be based on a personnel field, a client field, or any other appropriate field as will be apparent to those skilled in the art.

Finally, in a reminder generating operation 514, a reminder is generated for each recipient on the recipient list. A generated reminder includes filtered action items related to the particular recipient for which the reminder is generated. After generating reminders, the method returns to the timing operation 302 of FIG. 3.

Figure 6D:
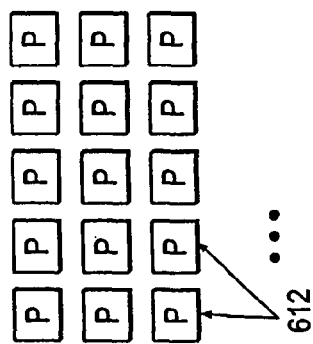
FIGS. 6A-6D illustrate types of action items stored in the database, in accordance with another aspect of the present invention.
Figure 6C:
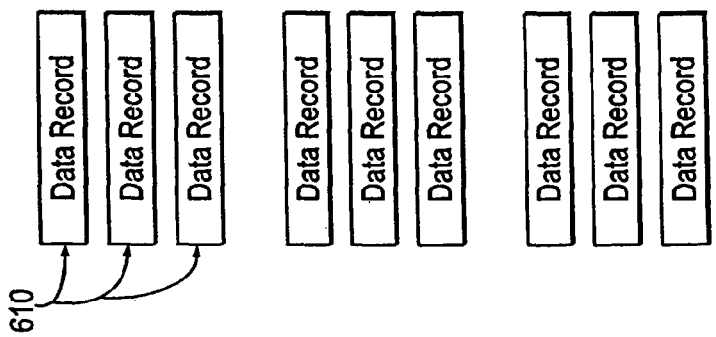
Figure 6B:
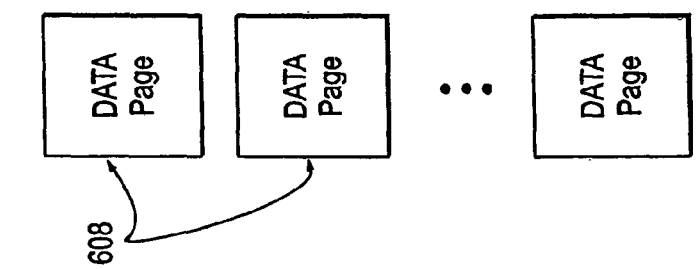
Figure 6A:
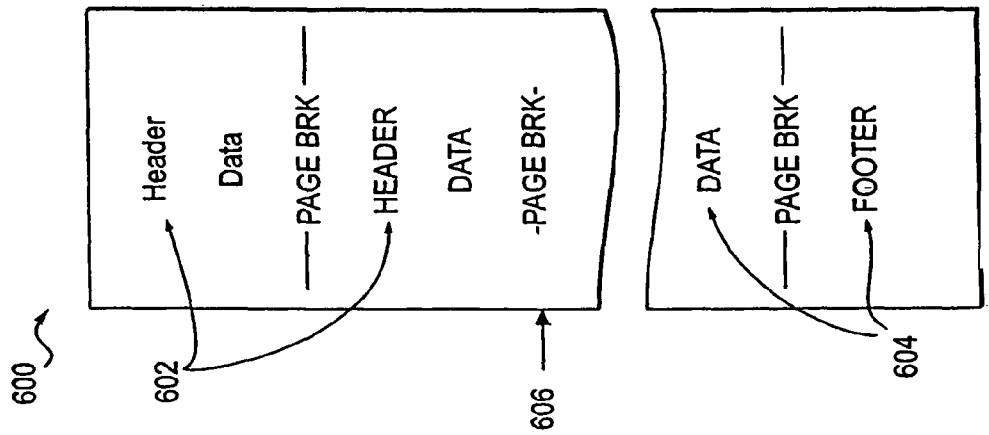

FIGS. 6A-6D are illustrations showing the results of the parsing operations of FIG. 5. FIG. 6A is an illustration showing a typically report 600 generated by a commercial report generator. The report includes header data 602 and footer data 604. Also shown are page breaks 606. Typically, the header 602 and footer 604 data contain information identifying the program, page number, and date the report was created. As discussed above, this information may not be needed in the final generated reminder or report, thus the report is preferably parsed out into pages as shown in FIG. 6B.

FIG. 6B is an illustration showing parsed pages 608 of information, based on the report shown in FIG. 6A. Each parsed page generally includes all the information included on a page in the generated report of FIG. 6A, without the header 602, footer 604, and page break 606 information.

FIG. 6C is an illustration showing parsed docket items 610, based on the parsed pages of FIG. 6B. The docket items of each parsed page are parsed out into individual docket items 610. Generally, each docket item 610 includes a record of data related to that particular docket item.

Finally, FIG. 6D is an illustration showing parsed fields 612, based on the parsed docket items 610. As discussed above, the parsed fields typically include action item type, personnel assigned to the action item, one or more dates, and related clients. Once the individual fields are parsed out of the generated report, the system can easily use them to generate a final reminder or report.

Figure 7A:
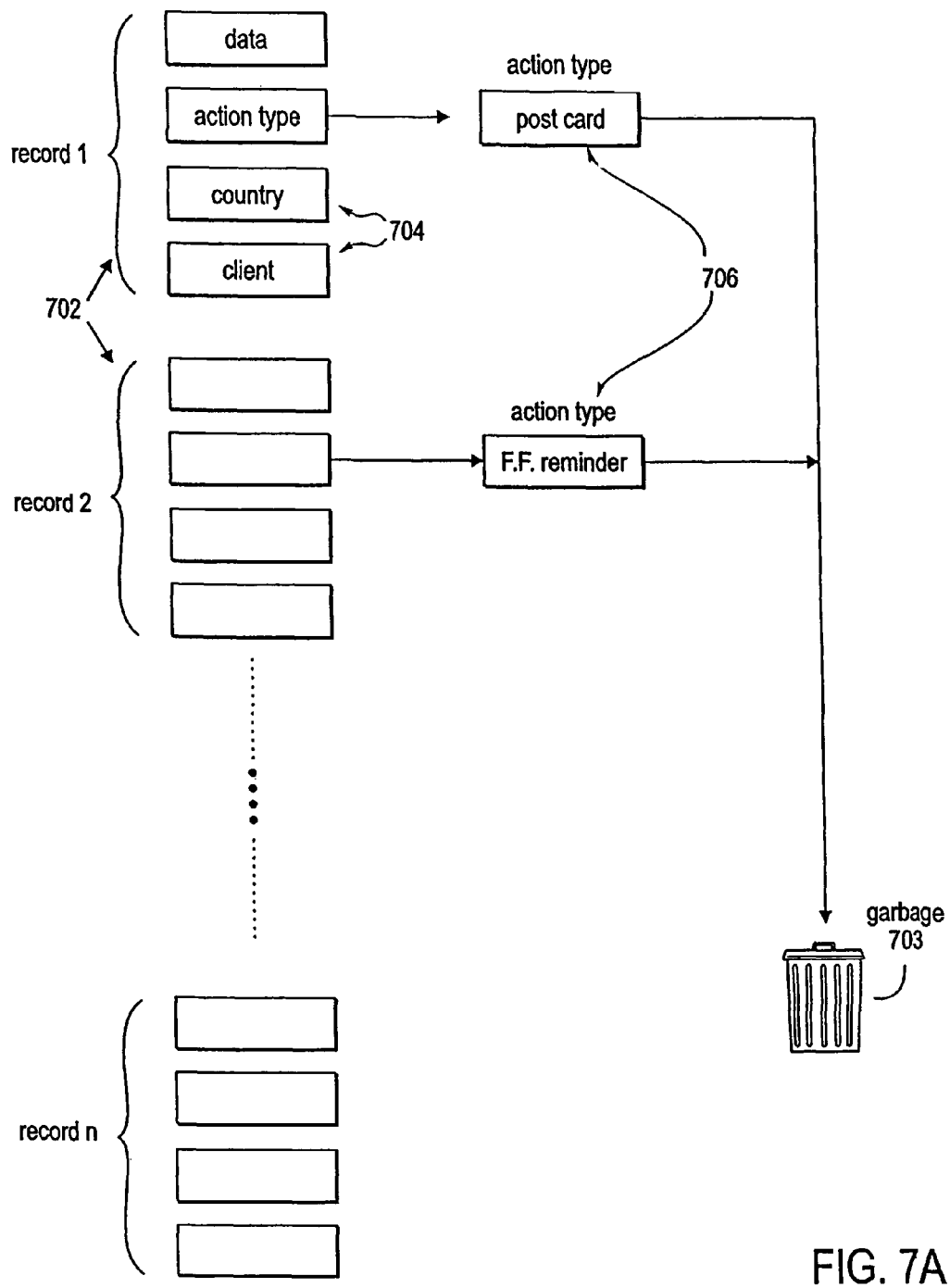
FIG. 7A is an illustration used to explain operations 502-508 of FIG. 5, in accordance with another aspect of the present invention.

FIG. 7A is a pictorial illustration used to explain operation 510 of FIG. 5. As shown in FIG. 7A, each record 702 of action items comprises many fields 704, such as date, action type, country of an application, and client information. The present invention provides several filters 706 selected from these fields. Each filter 706 typically includes a particular data related to a specified field. For example, a filter 706 may include the particular data "return receipt postcard" related to the specific field 704 of "action type." In this manner, filters can filter out unwanted records. If a field of a record matches a filter, the record includes unwanted data.

For example, a field 704 of a record 702 can be "action type." In addition, a filter 706 includes the particular data "return receipt postcard" related to the specific field 704 "action type." If the field 704 "action type", of a record 702 includes the specific data "return receipt postcard", the record 702 matches the filter 706. Thus, the system will determine that the record includes unwanted information. Finally, since the record 702 includes unwanted information, it is eliminated from further processing, as indicated by the garbage can 703.

Figure 7B:
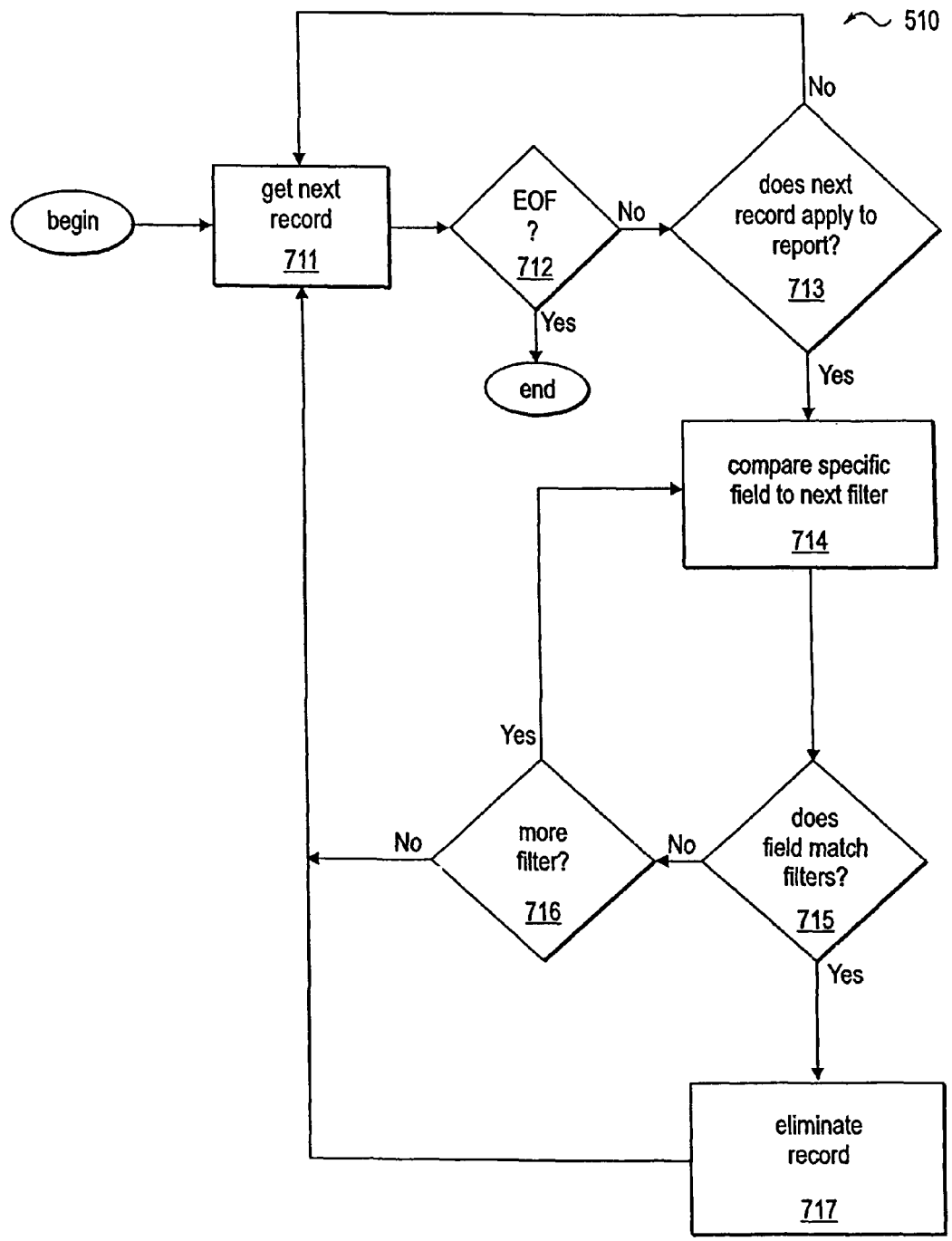
FIG. 7B is a flow diagram of the process illustrated in FIG. 7A.

FIG. 7B is a flowchart illustrating operation 510 of FIG. 5 for filtering docket items, in accordance with an embodiment of the present invention. The method 510 begins after the report, generated by the report generator, is parsed. Then, in a record obtaining operation 711, the next record in the database is obtained. This record preferably includes fields related to a single action item.

A decision is then made to determine if an End of File (EOF) is reached in operation 712. If the EOF has been reached, the method 510 is complete. However, if the EOF is not reached, the method continues with a record application operation 713.

In the record application operation 713, a decision is made as to whether the record applies to the particular report that is being generated. If the record does not apply to the particular report being generated, the record is ignored and the next record is obtained in operation 711. If the record does apply to the report, then the method 510 continues with operation 714.

In a comparing operation 714, the obtained record is compared to the next filter included in a filter list. A decision is then made as to whether a field in the record matches the filter, in operation 715. If a field in the record matches the filter, the record is eliminated, in an elimination operation 717. If a field in the record does not match the filter, the method 510 continues with operation 716.

In an additional filters operation 716, a determination is made as to whether more filters remain to be compared with the record. If more filters remain to be compared, the method 510 continues with the comparison operation 714. If no more filters remain to be compared, the method 510 continues with the record obtaining operation 711. The method then begins again until the EOF is reached.

Figure 8:
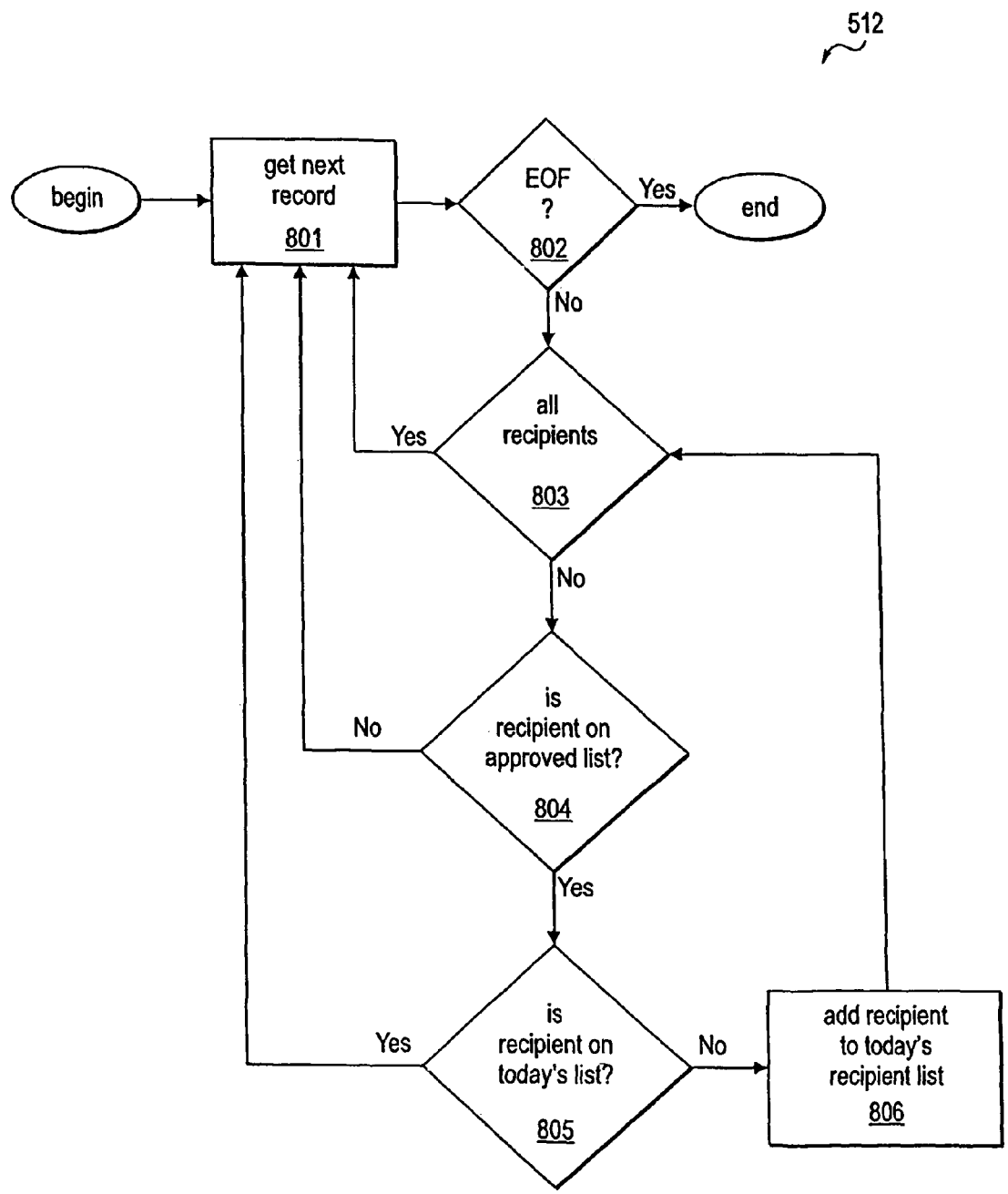
FIG. 8 is a flow diagram illustrating operation 512 of FIG. 5, in accordance with yet another aspect of the present invention.

FIG. 8 is a flow diagram illustrating operation 512 of FIG. 5 for creating a list of report and reminder recipients, in accordance with an embodiment of the present invention. The method 512, begins after the unwanted docket items are filtered out, in operation 510 of FIG. 5.

In a record obtaining operation 801, the next record in the database is obtained. This record preferably includes fields related to a single action item. A decision is then made as to whether an End of File (EOF) has been reached, in operation 802. If the EOF has been reached, the method 512 is complete, and operation 514 of FIG. 5 begins. However, if the EOF is not reached, the method 512 continues with an all recipients operation 803.

A decision is then made as to whether the record applies to all recipients, in operation 803. If the record applies to all recipients, the record is ignored and the method 512 obtains the next record, in operation 801. If the record does not apply to all recipients, the method 512 continues with a recipient check list operation 804.

Another decision is then made as to whether the recipient is on an approved list, in operation 804. If the recipient is not on the approved list, the record is ignored and the next record is obtained, in operation 801. If the recipient is on the approved list, the method 512 continues with operation 805.

Yet another decision is then made as to whether the recipient is on a the current recipient list, in operation 805. If the recipient is already on the current recipient list the record is ignored and the next record is obtained, in operation 801. If the recipient is not already on the current recipient list, the method 512 continues with operation 806.

In operation 806, the recipient is added to the current recipient list. In this manner, a list of recipients is generated, which includes only approved recipients, without including duplicate recipients. Finally, after the recipient is added to the current recipient list, the next record is obtained in operation 801. The method 512 continues until the EOF is reached.

Figure 9:
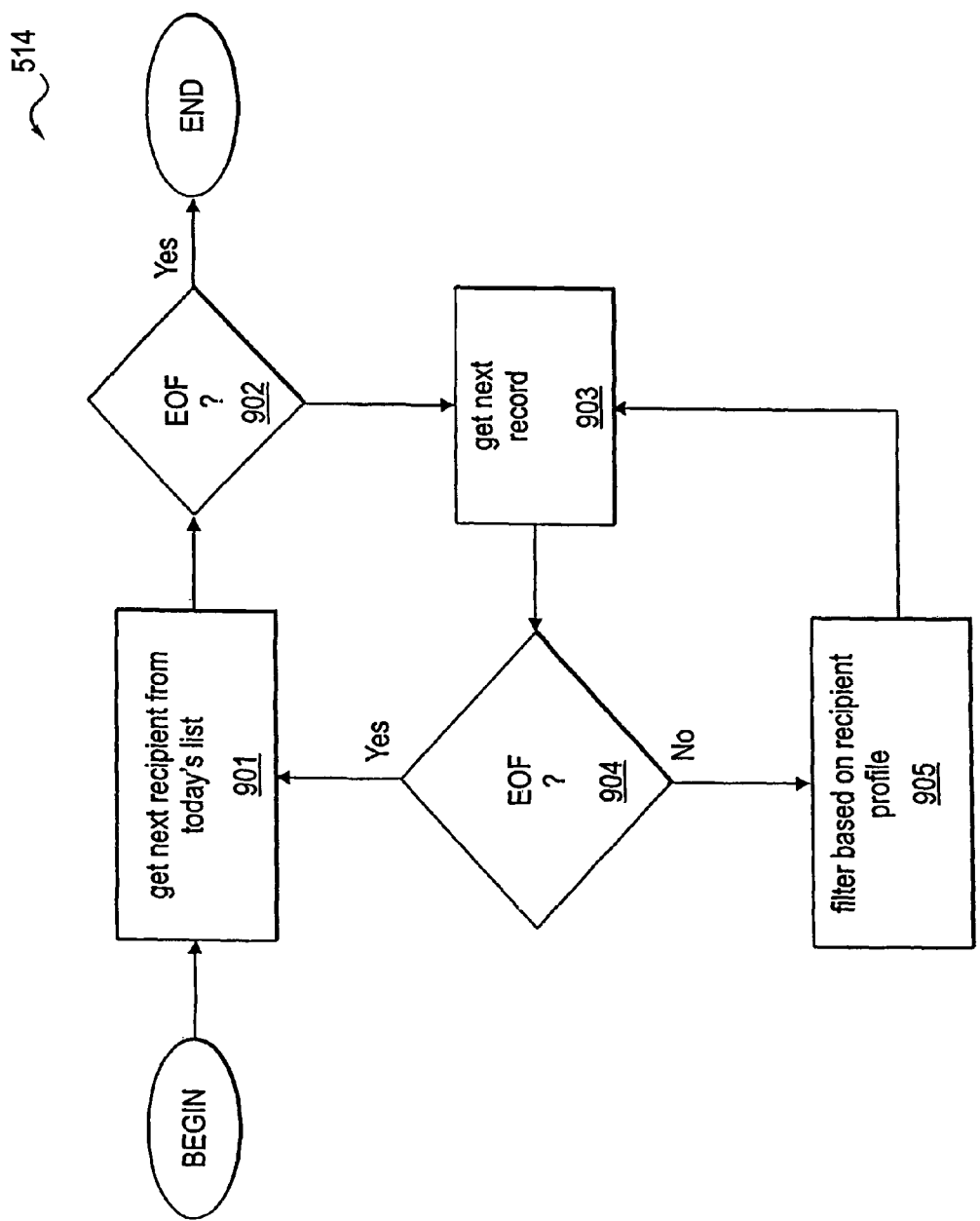
FIG. 9 is a flow diagram illustrating operation 514 of FIG. 5, in accordance with another embodiment of the present invention.

FIG. 9 is a flowchart illustrating the method 514 of FIG. 5 for generating a report for each recipient on the recipient list, in accordance with one aspect of the present invention. The method 514 begins after the recipient list is generated, in operation 512 of FIG. 5.

In a recipient obtaining operation 901, the next recipient on the current recipient list is obtained. A decision is then made as to whether an End of File (EOF) has been reached for the recipient list, in operation 902. If the EOF has been reached, the method 514 is complete, and operation 302 of FIG. 3 begins. However, if the EOF is not reached, the method 514 continues with a record obtaining operation 903.

In a record obtaining operation 903, the next record in the database is obtained. This record preferably includes fields related to a single action item.

A decision is then made as to whether an End of File (EOF) has been reached for the record database, in an operation 904. If the EOF has been reached, the next recipient is obtained from the current recipient list, in operation 901. However, if the EOF is not reached, the method 514 continues with filtering operation 905.

In a filtering operation 905, the record is filtered based on the particular recipients profile information. Preferably, each recipient has a related profile which includes filters selected to filter out unwanted information based on that particular recipient. After filtering the record, the next record is obtained in operation 903. The method 514 continues until the EOF is reached for the recipient list.

Figure 10A:
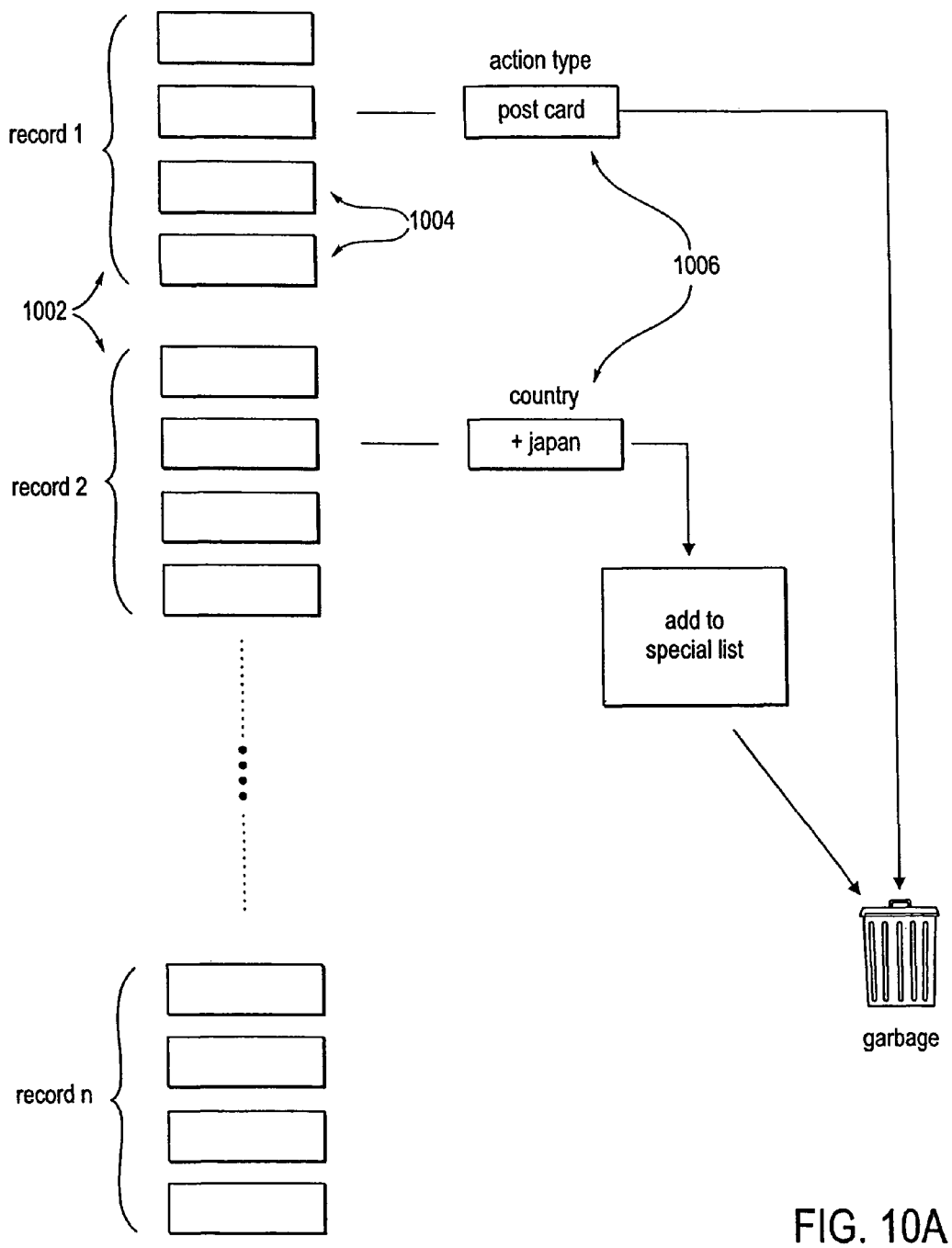
FIG. 10A is an illustration used to explain operation 905 of FIG. 9, in accordance with another embodiment of the present invention.

FIG. 10A is an illustration used to explain operation 905 of FIG. 9. More particularly, FIG. 10A is an illustration of a method for adding a record to a special list, in accordance with another embodiment of the present invention. As shown in FIG. 10A, a record 1002 of action items comprises many fields 1004, such as date, action type, country of an application, and client information. The present invention provides several filters 1006 selected from these fields. Each filter 1006 typically includes particular data related to a specified field. For example, a filter 1006 may include the particular data "return receipt postcard" related to the specific field 704 of "action type." In this manner, filters can filter out unwanted records. If a field of a record matches a filter, the record includes unwanted data.

In addition, each filter 1006 includes additional information in the form of some type of indicia, such as a plus (+) or a minus (−). If a filter includes a minus, the filter is utilized to eliminate unwanted information. If a filter includes a plus, the filter is utilized to add or "promote" records to the special list. The special list is typically used to differentiate the records that are on the special list, such as by placing them first in a report.

Figure 10B:
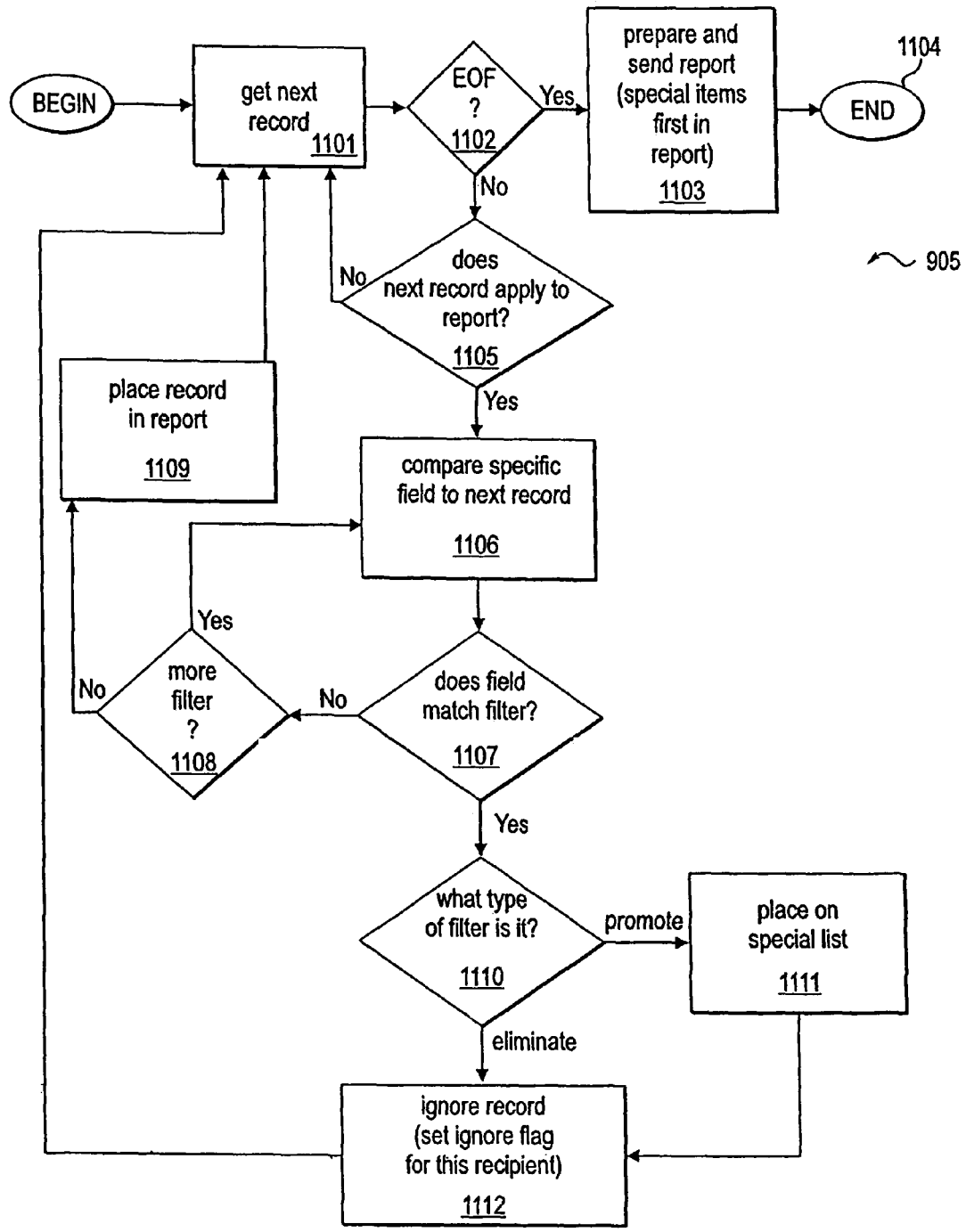
FIG. 10B is a flow diagram of the process illustrated in FIG. 10A.

FIG. 10B is a flow diagram further illustrating a method 905 of FIG. 9 for filtering records based on a recipient's profile, in accordance with another aspect of the present invention. The method 905 begins after an EOF is checked for the record database, as in operation 904 of FIG. 9. Then, in a record obtaining operation 1101, the next record in the database is obtained. This record preferably includes fields related to a single action item.

A decision is then made as to whether an End of File (EOF) has been reached in operation 1102. If the EOF has not been reached, the method 905 continues with a record application operation 1105. If the EOF has been reached the method 905 continues with a report preparation operation 1103.

In the report preparation operation 1103, a report is generated for the current recipient. Any items on the special list, discussed in detail subsequently, are preferably listed first. A preferred embodiment of the present invention sends the report by email to the current recipient. After sending the email, the method 905 is completed for the current recipient and the next recipient on the current recipient list is obtained, in operation 901 of FIG. 9.

If the EOF is not reached, a decision is made as to whether the record applies to the particular report that is being generated, in a record application operation 1105. If the record does not apply to the particular report being generated, the record is ignored and the next record is obtained in operation 1101. If the record does apply to the report, the method 905 then continues with operation 1106.

In a comparing operation 106, the obtained record is compared to the next filter included in a filter list. A decision is then made as to whether a field in the record matches the filter, in operation 1107. If a field in the record matches the filter, the method 905 continues with operation 1110. If a field in the record does not match the filter, the method 905 continues with operation 1108.

In an additional filters operation 1108, a determination is made as to whether more filters remain to be compared with the record. If more filters remain to be compared, the method 905 continues with the comparison operation 1106. If no more filters remain to be compared, the record is placed in the final report to the current recipient, in operation 1109. The method 905 then continues with the next record obtaining operation 1101.

Referring back to operation 1107, if a field in the record matches the filter, the type of filter is determined in operation 1110. If the filter is a plus (+) filter, the filter is an add or "promote" filter, and the record is placed on the special list, in operation 1111. If the filter is a minus (−) filter, the filter is an elimination filter, and the record is ignored by setting an "ignore record" flag for the current recipient, in operation 1112. The method 905 then continues with the next record obtaining operation 1101. The method 905 continues until an EOF is reached.

Figure 11:
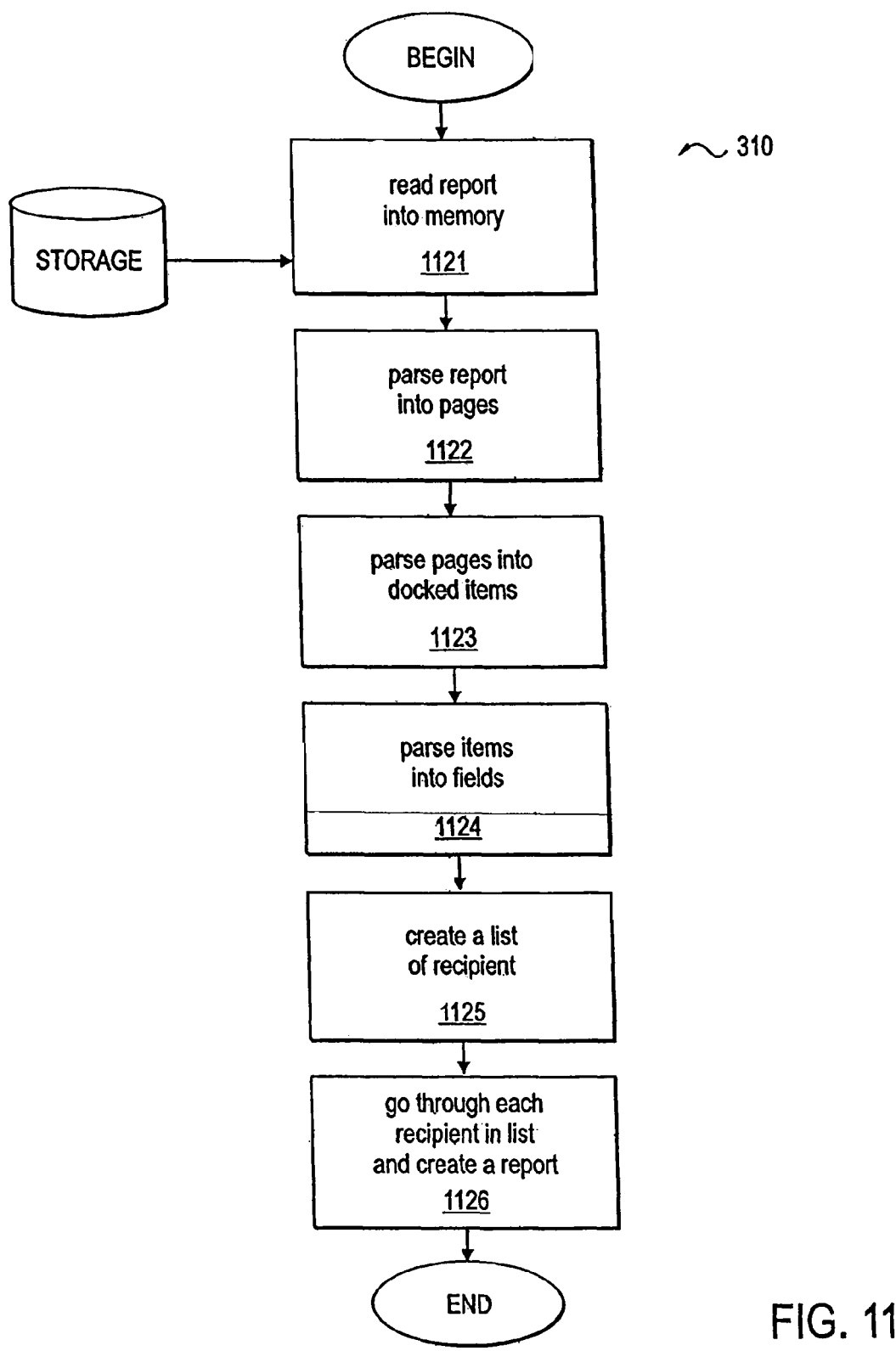
FIG. 11 is a flow diagram illustrating operation 310 of FIG. 3, in accordance with an embodiment of the present invention.

FIG. 11 is a flowchart further illustrating operation 310 of FIG. 3 for generating a report of completed action items, in accordance with yet another aspect of the present invention. In an initial operation 1121, a report generated in operation 308 is read into memory from a mass storage device, such as a hard disk. Preferably, the report includes action items falling within a given range of time based on the current date, such as within two weeks of the current date.

In a page parsing operation 1122, the report is parsed into pages of data. Typically, a report generated by a commercial report generator contains header and footer data which is not needed in the final report generated and sent out to a recipient. By parsing the generated report into pages, the header and footer data can be eliminated or saved for other uses. Moreover, other page formatting information, such as page breaks, may be eliminated by this technique.

In an item parsing operation 1123, the parsed pages of data are further parsed into docket items. Each docket item typically includes a record of data related to that particular docket item, including action item type, and often further includes personnel assigned to that action item.

Next, in a field parsing operation 1124, the parsed docket items are parsed into fields. In this operation, individual fields of the docket item records are parsed out. These fields typically include action item type, personnel assigned to the action item, and related clients.

In a recipient list operation 1125, a list of recipients is created. Using the fields of the filtered docket items, a list of recipients of the final generated report is created. The list may be based on a personnel field, a client field, or any other appropriate field as will be apparent to those skilled in the art.

Finally, in a report generating operation 1126, a report is generated for each recipient on the recipient list, created in operation 1125. A generated report includes filtered action items related to the particular recipient for which the report is generated. After generating reports, the method returns to the timing operation 302 of FIG. 3.

Figure 12:
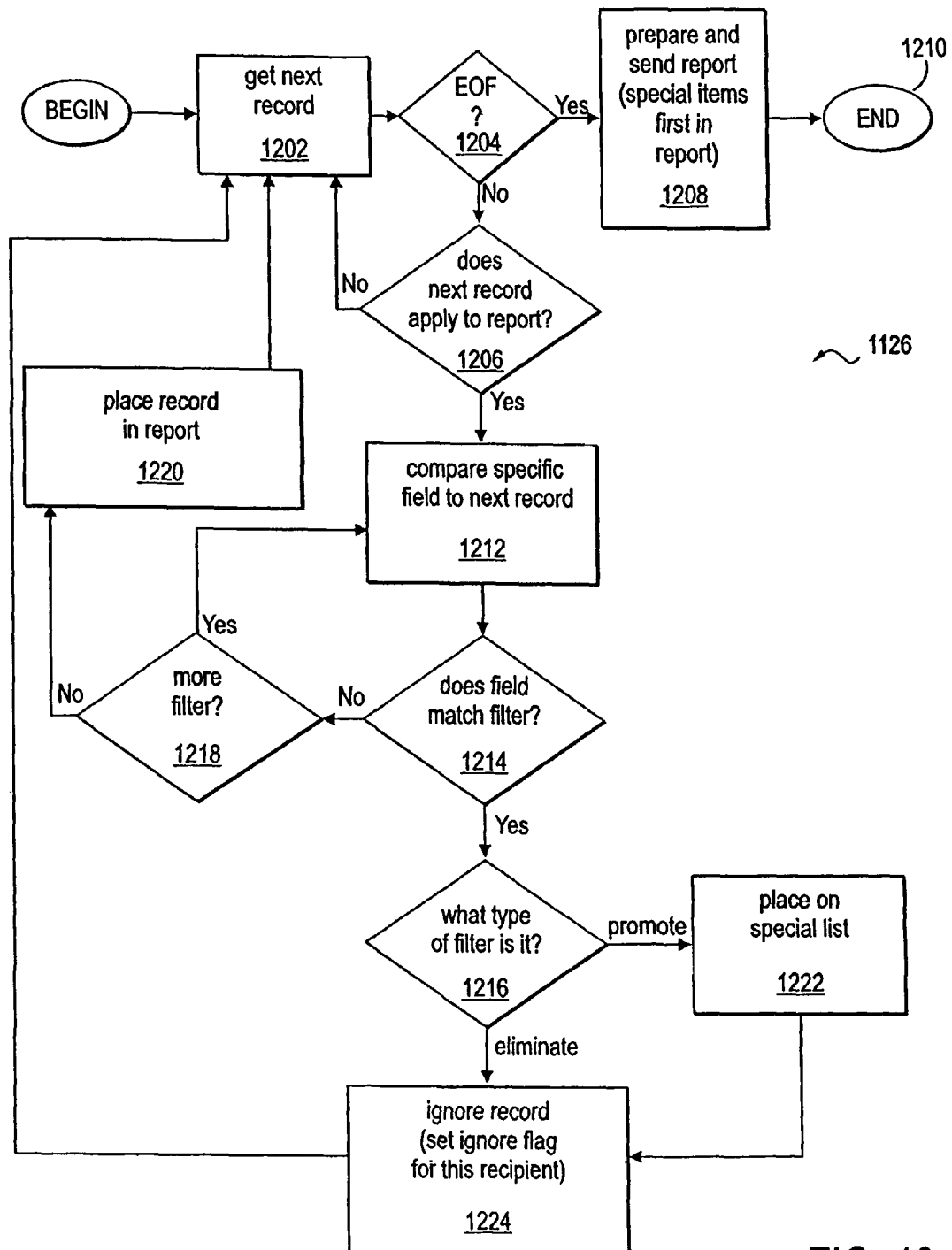
FIG. 12 is a flow diagram illustrating operation 126 of FIG. 11, in accordance with yet another aspect of the present invention.

FIG. 12 is a flowchart illustrating a method 1226 of FIG. 11 for generating a report for each recipient, in accordance with an embodiment of the present invention. The method 1226 begins after the current recipient list is created, as in operation 1125 of FIG. 11. Then, in a record obtaining operation 1202, the next record in the database is obtained. This record preferably includes fields related to a single action item.

A decision is then made as to whether an End of File (EOF) has been reached, in operation 1204. If the EOF has not been reached, the method continues 1226 with a record application operation 1206. If the EOF has been reached the method 1226 continues with a report preparation operation 1208.

In the report preparation operation 1208, a report is generated for the current recipient. Any items on the special list are preferably listed first. A preferred embodiment of the present invention sends the report by email to the current recipient. After sending the email, the method 1226 is completed for the current recipient, in operation 1210.

If the EOF is not reached, a decision is made as to whether the record applies to the particular report that is being generated, in operation 1206. If the record does not apply to the particular report being generated, the record is ignored and the next record is obtained, in operation 1202. If the record does apply to the report, the method 1226 continues with operation 1212.

In a comparing operation 1212, the obtained record is compared to the next filter included in a filter list. A decision is then made as to whether a field in the record matches the filter, in operation 1214. If a field in the record matches the filter, the method 1226 continues with operation 1216. If a field in the record does not match the filter, the method 1226 continues with operation 1218.

In an additional filters operation 1218, a determination is made as to whether more filters remain to be compared with the record. If more filters remain to be compared, the method 1226 continues with the comparison operation 1212. If no more filters remain to be compared, the record is placed in the final report to the current recipient in operation 1220. The method 1226 then continues with the next record obtaining operation 1202.

Referring back to operation 1214, if a field in the record matches the filter, the type of filter is determined in operation 1216. If the filter is a plus (+) filter, the filter is an add or "promote" filter, and the record is placed on the special list, in operation 1222. If the filter is a minus (−) filter, the filter is an elimination filter, and the record is ignored by setting an "ignore record" flag for the current recipient, in operation 1224. The method 1226 then continues with the next record obtaining operation 1202. The method 1226 repeats until an EOF is reached.

While the present invention has been described in terms of several preferred embodiments, there are many alterations, permutations, and equivalents which fall within the scope of this invention. It should also be noted that there are many alternative ways of implementing the methods and apparatuses of the present invention. It is therefore intended that the appended claims be interpreted as including all such alterations, permutations, and equivalents as fall within the true spirit and scope of the present invention.

The invention claimed is:

1. A computer implemented method for sending electronic mail docket reminders comprising:
   providing a docket database accessible by at least one server coupled to the Internet, said docket database having a plurality of records, each of which includes an action type and due date, and further including a list of a plurality of authorized recipient e-mail addresses;
   automatically determining on said at least one server that it is a time for a reminder notification action;
   automatically obtaining with said at least one server at least one action item from said docketing database;
   using at least one filter comprising at least one of a plus filter and a minus filter to respectively promote or eliminate said at least one action item; and
   automatically e-mailing from said at least one server to said plurality of authorized recipient e-mail addresses the at least one action item which has not been eliminated via the Internet, whereby said authorized recipients are each provided with a docket reminder via e-mail;
   wherein said providing a docket database, automatically determining that it is time for a reminder notification action, automatically obtaining at least one action item and automatically e-mailing from said at least one server are integrated processes.

2. A computer implemented method for sending electronic mail docket reports comprising:
   providing a docket database accessible by at least one server coupled to the Internet, said docket database having a plurality of records, each of which includes an action type and due date, and further including a plurality of authorized recipients associated with a plurality of authorized recipient e-mail addresses;
   automatically determining on said at least one server that it is a time for a report notification for an authorized recipient;
   automatically obtaining with said at least one server a list of completed action items in a given range from said docketing database and processing the list of completed action items into at least one completed action item report; and
   automatically e-mailing from said at least one server to said authorized recipient e-mail address the at least one completed action item report over the Internet, whereby said authorized recipient is provided with a completed action item report via e-mail;
   wherein said providing a docket database, automatically determining that it is time for a reminder notification action, automatically obtaining a list and automatically e-mailing from said at least one server are integrated processes.

3. A computer implemented method for sending electronic mail docket reports as recited in claim 2 wherein said recipient is one of a list of recipients.

4. A computer implemented method for sending electronic mail docket reports as recited in claim 3 wherein said report notification is e-mailed to a plurality of recipients of said list of recipients.

5. A computer implemented method for sending electronic mail docket reports as recited in claim 3 wherein said report notification is one of a plurality of report notifications which are e-mailed to a plurality of recipients of said list of recipients.

6. A computer implemented method for sending electronic mail docket reports as recited in claim 3 wherein said list of authorized recipient e-mail addresses corresponds to a list of designated recipients.

7. A computer implemented method for sending electronic mail docket reports comprising:
   initializing a docket database on at least one server coupled to the Internet having a plurality of records, each of which includes an action type and due date, and further including a plurality of authorized recipients associated with a plurality of authorized recipient e-mail addresses;
   automatically determining on said at least one server that it is a time for a reminder notification;
   automatically obtaining with said at least one server a list of action items in a given date range from said docketing database and processing the list of action items into an action item reminder report using at least one filter to filter out unwanted action items; and
   automatically e-mailing from said at least one server to said authorized recipient e-mail address the action item reminder report over the Internet, whereby said authorized recipient is provided with said action item reminder report via e-mail;
   wherein said initializing, automatically determining, automatically obtaining and automatically e-mailing from said at least one server are integrated processes.

8. A computer implemented method for sending electronic mail docket reports as recited in claim 7 wherein said recipient is one of a list of recipients.

9. A computer implemented method for sending electronic mail docket reports as recited in claim 8 wherein said reminder notification is e-mailed to a plurality of recipients of said list of recipients.

10. A computer implemented method for sending electronic mail docket reports as recited in claim 8 wherein said reminder notification is one of a plurality of reminder notifications which are e-mailed to a plurality of recipients of said list of recipients.

11. A computer implemented method for sending electronic mail docket reports as recited in claim 8 wherein said list of recipients is a list of designated recipients.

* * * * *